United States Patent Office 2,716,635
Patented Aug. 30, 1955

2,716,635

VULCANIZATION OF RUBBER

Arnold R. Davis, Riverside, Conn., assignor to American Cyanamid Company, New York, N. Y., a corporation of Maine No Drawing. Application December 23, 1952,
Serial No. 327,671

20 Claims. (Cl. 260—3)

This invention relates to a new vulcanization process adapted for use with both natural and synthetic rubbers. More particularly, it relates to vulcanization of natural and synthetic rubbers employing a new type of accelerator which constitutes a reaction product of paraformaldehyde, a thiazole and a diarylguanidine salt of a mercaptan or a dithiocarbamic acid. The present invention relates to both natural and synthetic rubber compositions containing the new type of accelerator and to vulcanization thereof. The new series of chemical products which constitutes the new type of accelerator forms the subject matter of my copending application for United States Letters Patent Serial No. 327,672, filed of even date.

The accelerators used in accordance with the present invention are reaction products of paraformaldehyde, a thiazole and a diarylguanidine salt of a mercaptan or a dithiocarbamic acid. Among the thiazoles which may be employed are mercaptobenzothiazole, mercaptothiazoline, benzothiazolyl disulfide and the like. Illustrative of the mercaptans which may be employed are mercaptobenzothiazole and mercaptothiazoline. Various diarylguanidines such as diphenyl, ditolyl, particularly the di-o-tolyl, dixylyl, dinapthyl and the like, may be employed.

The dithiocarbamic acid may be widely varied according to the following formula:

$$HSSCN\diagup^{R_1}_{\diagdown R_2}$$

in which $R_1$ is a radical selected from the group consisting of H, alkyl, aryl, alkoxyalkyl and thiazyl-substituted alkyl, and $R_2$ represents an aryl radical; but when $R_1$ is a radical selected from the group consisting of alkyl, aryl, alkoxyalkyl and thiazyl-substituted alkyl, then $R_2$ represents a radical selected from the group consisting of alkyl, aryl and alkoxyalkyl; and in which $R_1$ and $R_2$ when taken together with the nitrogen form a heterocylic ring.

Among the preferred dithiocarbamic acids are the aryl dithiocarbamic acids such as the phenyl; dialkyl dithiocarbamic acids such as dimethyl, diethyl and dibutyl; di-aryl dithiocarbamic acids such as the diphenyl; bis alkoxyalkyl dithiocarbamic acids such as the bis ethoxypropyl; alkylaryl dithiocarbamic acids such as N,N-propylphenyl and N,N-butylphenyl; thiazyl substituted alkyl dithiocarbamic acids such as benzothiazylthiomethyl, phenyl and the like; and dithiocarbamic acids in which the nitrogen bound substituents together with the nitrogen form a heterocyclic ring such as morpholine, piperidine and the like.

The accelerators of the present invention are useful with natural rubber and also with synthetic rubbers such, for instance, as Butyl rubber (a copolymer of olefine with a small amount of diolefine), and polymers of the butadiene-styrene and butadiene-acrylic type. Use may be made thereof either alone or in combination with other accelerators, activators, retarders and the like. They may be used in conjunction with known types of rubber compositions which will contain other compounding materials, none of which form any part of this invention.

The proportions in which the diarylguanidine salt, formaldehyde and mercaptan are combined may be quite widely varied. In general, however, it has been found preferable to use one mol part of the diarylguanidine salt, 1–4 mol parts of formaldehyde and 1–4 mol parts of mercaptan. The products may be readily produced by heating the reactants to the fusion point and continuing heating until reaction is complete.

The following examples illustrate the preparation of the accelerators and their use in vulcanization of rubber. The examples are meant to be illustrative only and not by way of limitation. Unless otherwise noted, all parts are by weight. For simplification, the following abbreviations will be used:

DPG—diphenylguanidine
DOTG—di-o-tolylguanidine
DXG—dixylylguanidine
MBT—mercaptobenzothiazole
MT—mercaptothiazoline
BTDS—benzothiazolyl disulfide

*Example 1*

A mixture is prepared of the following materials by grinding together in a mortar:

|  | Parts | Mols |
|---|---|---|
| (DPG) $\left( HSSCN\diagup^{H}_{\diagdown C_6H_5}\right)$ | 190 | 1 |
| Methylol MBT | 394 | 4 |

The mixture is heated for 30 minutes to a temperature of 85° C. and then held at 85°–90° C. for an additional 45 minutes. A clear brownish colored balsam is formed on cooling.

*Example 2*

A mixture of the following materials is prepared:

|  | Parts | Mols |
|---|---|---|
| (DPG) $\left( HSSCN\diagup^{C_2H_5}_{\diagdown C_6H_5}\right)$ | 204 | 1 |
| Methylol MBT | 296 | 3 |

This mixture is heated in a suitable vessel for 35 minutes to 85° C. and then held between 85°–90° C. for 30 minutes. A clear reddish liquid results which gives a clear film on cooling.

*Example 3*

The following materials are mixed together:

|  | Parts | Mols |
|---|---|---|
| (DPG) $\left( HSSCN\diagup^{C_2H_5}_{\diagdown C_6H_5}\right)$ | 102 | 1 |
| paraformaldehyde | 23 | 3 |
| MBT | 42 | 1 |
| BTDS | 84 | 1 |

The mixture is heated to 90° C. in 25 minutes and held there for an additional 45 minutes. A soft brown resin is formed which gives a clear film.

Example 4

A mixture is prepared of the following materials:

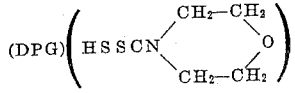

|  | Parts | Mols |
|---|---|---|
| (DPG)(HSSCN(CH₂-CH₂-O-CH₂-CH₂)) | 94 | 1 |
| paraformaldehyde | 23 | 3 |
| MBT | 125 | 3 |

The mixture is heated to 100° C. and held there for 10 minutes at which time most of frothing stops. It is then heated for an additional 15 minutes at 80°–90° C. on a steam bath. A clear resin results on cooling.

Example 5

A mixture similar to that of Example 4 is prepared using (DPG) (MBT):

|  | Parts | Mols |
|---|---|---|
| (DPG)(MBT) | 95 | 1 |
| paraformaldehyde | 23 | 3 |
| MBT | 125 | 3 |

The mixture is heated to 105° C. and held there for 45 minutes. A clear brownish resin is formed.

Example 6

The following materials are mixed:

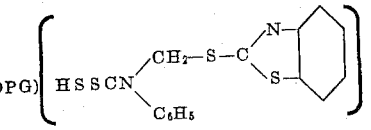

|  | Parts | Mols |
|---|---|---|
| (DPG)[HSSCN(CH₂-S-C(N,S)C₆H₅)] | 112 | 1 |
| paraformaldehyde | 12 | 2 |
| MBT | 67 | 2 |

The mixture is fused in a beaker at 90° C. for 45 minutes accompanied by considerable frothing which ceases after about 35 minutes. A clear yellowish resin forms which softens at about 80° C.

Example 7

A mixture of the following materials is prepared:

|  | Parts | Mols |
|---|---|---|
| (DOTG)(MBT) | 102 | 1 |
| paraformaldehyde | 23 | 3 |
| MBT | 125 | 3 |

The mixture is heated to 100–105° C. and held there for 35–40 minutes. On cooling a clear resin results.

Example 8

The procedure of Example 7 is repeated using the following materials:

|  | Parts | Mols |
|---|---|---|
| (DXG)(HSSCN(C₂H₅)(C₂H₅)) | 104 | 1 |
| paraformaldehyde | 23 | 3 |
| MBT | 125 | 3 |

After 45 minutes heating at 110° C., a clear resinous product is obtained.

Example 9

A mixture is prepared of the following materials and heated at 95°–100° C.:

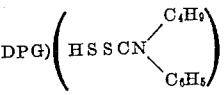

|  | Parts | Mols |
|---|---|---|
| (DPG)(HSSCN(C₄H₉)(C₆H₅)) | 145 | 1 |
| paraformaldehyde | 20 | 2 |
| MBT | 111 | 2 |

After about 40 minutes a clear resin is obtained.

Example 10

Example 5 is repeated using mercaptothiazoline:

|  | Parts | Mols |
|---|---|---|
| (DPG)(MBT) | 95 | 1 |
| paraformaldehyde | 23 | 3 |
| MT | 89 | 3 |

The mixture is heated at 105–110° C. for 35 minutes. On cooling a clear resinous product is obtained.

Example 11

A mixture of the following materials is prepared:

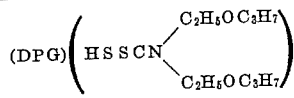

|  | Parts | Mols |
|---|---|---|
| (DPG)(HSSCN(C₂H₅OC₃H₇)(C₂H₅OC₃H₇)) | 80 | 1 |
| paraformaldehyde | 15 | 3 |
| MBT | 84 | 3 |

The mixture is heated to 100–105° C. and held there for about 30 minutes. A clear resin results.

Example 12

The following compositions were prepared and tested, and the results shown below obtained:

| | Compositions | | |
|---|---|---|---|
| | A | B | C |
| GR-S (a butadiene-styrene copolymer) | 100 | 100 | 100 |
| Bardol (coal tar softener) | 5 | 5 | 5 |
| E. P. C. Black | 50 | 50 | 50 |
| Zinc Oxide | 5 | 5 | 5 |
| (DPG)(HSSCN(C$_2$H$_4$/C$_6$H$_5$))(HCHO)(MBT)—Ex. 2 | 1 | | |
| (DPG)(HSSCN(C$_2$H$_4$/C$_6$H$_5$))(HCHO)(MBT)(BTDS)—Ex. 3 | | 1 | |
| (DPG)(MBT)(HCHO)(MBT)—Ex. 5 | | | 0.75 |
| | 60′ cure at 141° C. | | |
| Shore Hardness (30″) | 66 | 65 | 62 |
| Modulus at 300% | 1,760 | 1,725 | 1,500 |
| Tensile | 2,940 | 2,855 | 2,960 |
| Elongation | 420 | 415 | 485 |

I claim:

1. A composition obtained by milling together an unvulcanized vulcanizable rubber and an accelerator obtained by reacting 1-4 mol parts of formaldehyde, 1-4 mol parts of a thiazole selected from the group consisting of mercaptobenzothiazole, mercaptothiazoline and benzothiazolyl disulfide, and one mol part of the diarylguanidine salt containing the radical selected from the group consisting of

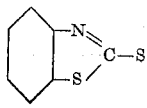

and

in which $R_1$ is selected from the group consisting of H, alkyl, aryl, alkoxyalkyl and thiazyl-substituted alkyl, and $R_2$ represents an aryl radical; but when $R_1$ is a radical selected from the group consisting of alkyl, aryl, alkoxyalkyl and thiazyl-substituted alkyl, then $R_2$ represents a radical selected from the group consisting of alkyl, aryl and alkoxyalkyl; and in which $R_1$ and $R_2$ taken together with the nitrogen constitute a heterocyclic ring.

2. A composition according to claim 1 in which the accelerator is a reaction product of 1-4 mol parts of formaldehyde, 1-4 mol parts of mercaptobenzothiazole and one mol part of a diarylguanidine salt of mercaptobenzothiazole.

3. A composition according to claim 2 in which the diarylguanidine is diphenylguanidine.

4. A composition according to claim 2 in which the diarylguanidine is di-o-tolylguanidine.

5. A composition according to claim 2 in which the diarylguanidine is dixylylguanidine.

6. A composition according to claim 1 in which the accelerator is a reaction product of 1-4 mol parts of formaldehyde, 1-4 mol parts of mercaptobenzothiazole and one mol part of a diphenylguanidine salt of a dialkyl dithiocarbamic acid.

7. A composition according to claim 1 in which the accelerator is a reaction product of 1-4 mol parts of formaldehyde, 1-4 mol parts of mercaptobenzothiazole and one mol part of a diphenylguanidine salt of a bis alkoxyalkyl dithiocarbamic acid.

8. A composition according to claim 1 in which the accelerator is a reaction product of 1-4 mol parts of formaldehyde, 1-4 mol parts of mercaptobenzothiazole and one mol part of a diphenylguanidine salt of an alkylaryl dithiocarbamic acid.

9. A composition according to claim 1 in which the accelerator is a reaction product of 1-4 mol parts of formaldehyde, 1-4 mol parts of mercaptobenzothiazole and one mol part of a diphenylguanidine salt of a thiazyl-substituted alkyl dithiocarbamic acid.

10. A composition according to claim 1 in which the accelerator is a reaction product of 1-4 mol parts of formaldehyde, 1-4 mol parts of mercaptobenzothiazole and one mol part of a diphenylguanidine salt of a cycloalkyl dithiocarbamic acid.

11. A process of vulcanizing natural and synthetic rubbers which comprises the steps of milling together a mixture comprising an unvulcanized vulcanizable rubber composition and an accelerator obtained by reacting together 1-4 mol parts of formaldehyde, 1-4 mol parts of a thiazole selected from the group consisting of mercaptobenzothiazole, mercaptothiazoline and benzothiazolyl disulfide, and one mol part of the diarylguanidine salt containing the radical selected from the group consisting of

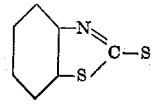

and

in which $R_1$ is selected from the group consisting of H, alkyl, aryl, alkoxyalkyl and thiazyl-substituted alkyl, and $R_2$ represents an aryl radical; but when $R_1$ is a radical selected from the group consisting of alkyl, aryl, alkoxyalkyl and thiazyl-substituted alkyl, then $R_2$ is a radical selected from the group consisting of alkyl, aryl and alkoxyalkyl; and in which $R_1$ and $R_2$ taken together with the nitrogen constitute a heterocyclic ring; and subjecting the mixture to heat for sufficient time to establish the cure of the rubber.

12. A process according to claim 11 in which the accelerator is a reaction product of 1-4 mol parts of formaldehyde, 1-4 mol parts of mercaptobenzothiazole, and one mol part of a diarylguanidine salt of mercaptobenzothiazole.

13. A process according to claim 12 in which the diarylguanidine is diphenylguanidine.

14. A process according to claim 12 in which the diarylguanidine is di-o-tolylguanidine.

15. A process according to claim 12 in which the diarylguanidine is dixylylguanidine.

16. A process according to claim 11 in which the accelerator is a reaction product of 1–4 mol parts of formaldehyde, 1–4 mol parts of mercaptobenzothiazole and one mol part of a diarylguanidine salt of a dialkyl dithiocarbamic acid.

17. A process according to claim 11 in which the accelerator is a reaction product of 1–4 mol parts of formaldehyde, 1–4 mol parts of mercaptobenzothiazole and one mol part of a diarylguanidine salt of a bis alkoxyalkyl dithiocarbamic acid.

18. A process according to claim 11 in which the accelerator is a reaction product of 1–4 mol parts of formaldehyde, 1–4 mol parts of mercaptobenzothiazole and one mol part of a diarylguanidine salt of an alkylaryl dithiocarbamic acid.

19. A process according to claim 11 in which the accelerator is a reaction product of 1–4 mol parts of formaldehyde, 1–4 mol parts of mercaptobenzothiazole and one mol part of a diarylguanidine salt of a thiazyl-substituted alkyl dithiocarbamic acid.

20. A process according to claim 11 in which the accelerator is a reaction product of 1–4 mol parts of formaldehyde, 1–4 mol parts of mercaptobenzothiazole and one mol part of a diarylguanidine salt of a cycloalkyl dithiocarbamic acid.

References Cited in the file of this patent

UNITED STATES PATENTS

| | | |
|---|---|---|
| 1,656,891 | Scott | Jan. 17, 1928 |
| 2,173,731 | Scott | Sept. 19, 1939 |